(12) United States Patent
Kawao

(10) Patent No.: US 11,526,457 B2
(45) Date of Patent: Dec. 13, 2022

(54) SEMICONDUCTOR DEVICE AND METHOD OF OPERATING THE SAME

(71) Applicant: RENESAS ELECTRONICS CORPORATION, Tokyo (JP)

(72) Inventor: Taro Kawao, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 67 days.

(21) Appl. No.: 17/065,260

(22) Filed: Oct. 7, 2020

(65) Prior Publication Data

US 2021/0133130 A1 May 6, 2021

(30) Foreign Application Priority Data

Nov. 5, 2019 (JP) .............................. JP2019-200436

(51) Int. Cl.
*G06F 13/26* (2006.01)
*G06F 11/07* (2006.01)

(52) U.S. Cl.
CPC ............ *G06F 13/26* (2013.01); *G06F 11/079* (2013.01); *G06F 11/0745* (2013.01); *G06F 11/0751* (2013.01)

(58) Field of Classification Search
None
See application file for complete search history.

(56) References Cited

U.S. PATENT DOCUMENTS

| 5,369,767 A * | 11/1994 | Dinwiddie, Jr. ...... | G06F 15/173 |
| | | | 714/E11.007 |
| 7,350,005 B2 * | 3/2008 | Yiu ......................... | G06F 13/24 |
| | | | 710/262 |
| 9,575,911 B2 * | 2/2017 | McMenamin ........... | G06F 13/26 |
| 10,042,791 B2 * | 8/2018 | Hirade ..................... | G06F 13/24 |
| 2014/0047150 A1 * | 2/2014 | Marietta ............... | G06F 9/5077 |
| | | | 710/264 |
| 2015/0019779 A1 | 1/2015 | Hirade et al. | |
| 2017/0019142 A1 * | 1/2017 | Mitsuishi ................. | H04B 1/44 |

FOREIGN PATENT DOCUMENTS

JP 2015-018414 A 1/2015

* cited by examiner

*Primary Examiner* — Michael Sun
(74) *Attorney, Agent, or Firm* — McDermott Will & Emery LLP

(57) ABSTRACT

The present invention relates to a semiconductor device having a first processor element configured to receive a first interrupt request signal, a second processor element configured to receive a second interrupt request signal, a first priority determination circuit configured to receive a plurality of interrupt signals and to output the first interrupt request signal to the first processor element, a second priority determination circuit configured to receive the plurality of interrupt signals and to output the second interrupt request signal to the second processor element, a checker circuit configured detect failures of the first priority determination circuit and the second priority determination circuit, and a control circuit configured to select one of the first priority determination circuit or the second priority determination circuit as a circuit to be checked. The control circuit selects the circuit to be checked based on the first interrupt request signal and the second interrupt request signal.

16 Claims, 10 Drawing Sheets

SEMICONDUCTOR DEVICE AND METHOD OF OPERATING THE SAME

CROSS-REFERENCE TO RELATED APPLICATIONS

The disclosure of Japanese Patent Application No. 2019-200436 filed on Nov. 5, 2019 including the specification, drawings and abstract is incorporated herein by reference in its entirety.

BACKGROUND

The present invention relates to a semiconductor device and an operation method of the semiconductor device, and, for example, relates to a semiconductor device that monitors an operation of an interrupt control circuit configured to instruct an interrupt to a central processing unit, and an operation method of such a semiconductor device.

In a system that requires high reliability, a mechanism called functional safety is applied. For example, ISO 26262 is a functional safety standard for an automotive control system. In a system where functional safety (specifically, a fail-safe function) is applied, it is necessary to achieve a high failure detection rate regarding expected failure modes.

There is a disclosed technique listed below.

[Patent Document 1] Japanese Unexamined Patent Application Publication No. 2015-18414

SUMMARY

However, in the failure detection method according to Patent Document 1, it is necessary for the interrupt request flag to be read and checked by software. In a case where there are a large number of interrupt factors, a problem arises in which it would take a long time to read the interrupt request flag and compare it with the previously read interrupt request flag.

The object of the present invention is to quickly detect a failure of a priority determination circuit in the interrupt controller while suppressing an increase in the amount of hardware. Other objects and novel features will be apparent from the description in the present specification and the attached drawings.

A semiconductor device according to an embodiment of the present invention comprises a first processor element configured to receive a first interrupt request signal, a second processor element configured to receive a second interrupt request signal, a first priority determination circuit configured to receive a plurality of interrupt signals and to output a first interrupt request signal to the first processor element, a second priority determination circuit configured to receive a plurality of interrupt signals and to output a second interrupt request signal to the second processor element, a checker circuit configured to detect failures of the first priority determination circuit and the second priority determination circuit, and a control circuit configured to select one of the first priority determination circuit or the second priority determination circuit as a circuit to be checked. The control circuit receives the first interrupt request signal and the second interrupt request signal, and selects the circuit to be checked based on the first interrupt request signal and the second interrupt request signal.

The semiconductor device according to another embodiment of the present invention comprises an N number of processor elements (where N is a natural number and satisfies N≥2), an N number of priority determination circuits configured to receive an interrupt signal and to output an N number of sets of interrupt request signals to the N number of processor elements, a checker circuit configured to perform a same processing as in one of the N number of priority determination circuits and to output an interrupt request signal, a control circuit configured to select one of the N number of priority determination circuits as a circuit to be checked based on the N number of sets of interrupt request signals, and a determination circuit configured to compare the interrupt request signal that is output by the circuit to be checked and the interrupt request signal that is output by the checker circuit, and to output an error signal based on a comparison result.

An operation method of a semiconductor device according to another embodiment of the present invention is an operation method of a semiconductor device comprising a plurality of processor elements, a plurality of priority determination circuits and a checker circuit. The method includes a step of outputting an interrupt request signal to the processor element corresponding to each of the plurality of priority determination circuits, a step of selecting one of the plurality of priority determination circuits as a circuit to be checked, a step of making the checker circuit execute a processing based on a selection result obtained in the step of selecting, a step of comparing an output signal of the circuit to be checked and an output signal of the checker circuit, and a step of outputting an error signal based on a comparison result obtained in the step of comparing. The step of selecting further includes a step of selecting the priority determination circuit that outputs an activated interrupt request signal as the circuit to be checked.

According to the embodiment, the semiconductor device is capable of quickly detecting a failure of the priority determination circuit in the interrupt controller while suppressing an increase in the amount of hardware.

DETAILED DESCRIPTION

Contents of the following description and attached drawings are partially omitted or simplified as appropriate for the sake of clarity. Note that, in all of the drawings, the same members are denoted by the same reference signs, and redundant descriptions thereof are omitted as appropriate.

Before describing the present invention, techniques (hereinafter referred to as "comparative example") considered by the present inventor will first be described.

First Comparative Example

In order to check for any failure of a priority determination circuit in an interrupt controller, the semiconductor device according to a first comparative example comprises a checker circuit constituted by a same circuit as in the priority determination circuit which is a circuit to be checked (master circuit). If an output of the master circuit and an output of the checker circuit are the same, it can be determined that the master circuit is in a normal state with no failure. On the other hand, if the output of the master circuit and the output of the checker circuit differ, it is determined that a failure has occurred in the master circuit. Although the semiconductor device according to the first comparative example is capable of detecting a failure that occurred in the priority determination circuit, the checker circuit causes the amount of hardware to increase.

Second Comparative Example

The semiconductor device according to a second comparative example comprises one checker circuit for a plurality of priority determination circuits which are master circuits. The checker circuit sequentially checks the plurality of priority determination circuits one by one. The semiconductor device according the second comparative example comprises one checker circuit for a plurality of priority determination circuits, whereby an increase in the amount of hardware caused by the checker circuit can be suppressed. However, a problem arises in that frequency of checking each of the master circuits decreases depending on the number of CPUs (Central Processing Units).

First Embodiment

Figure 1:
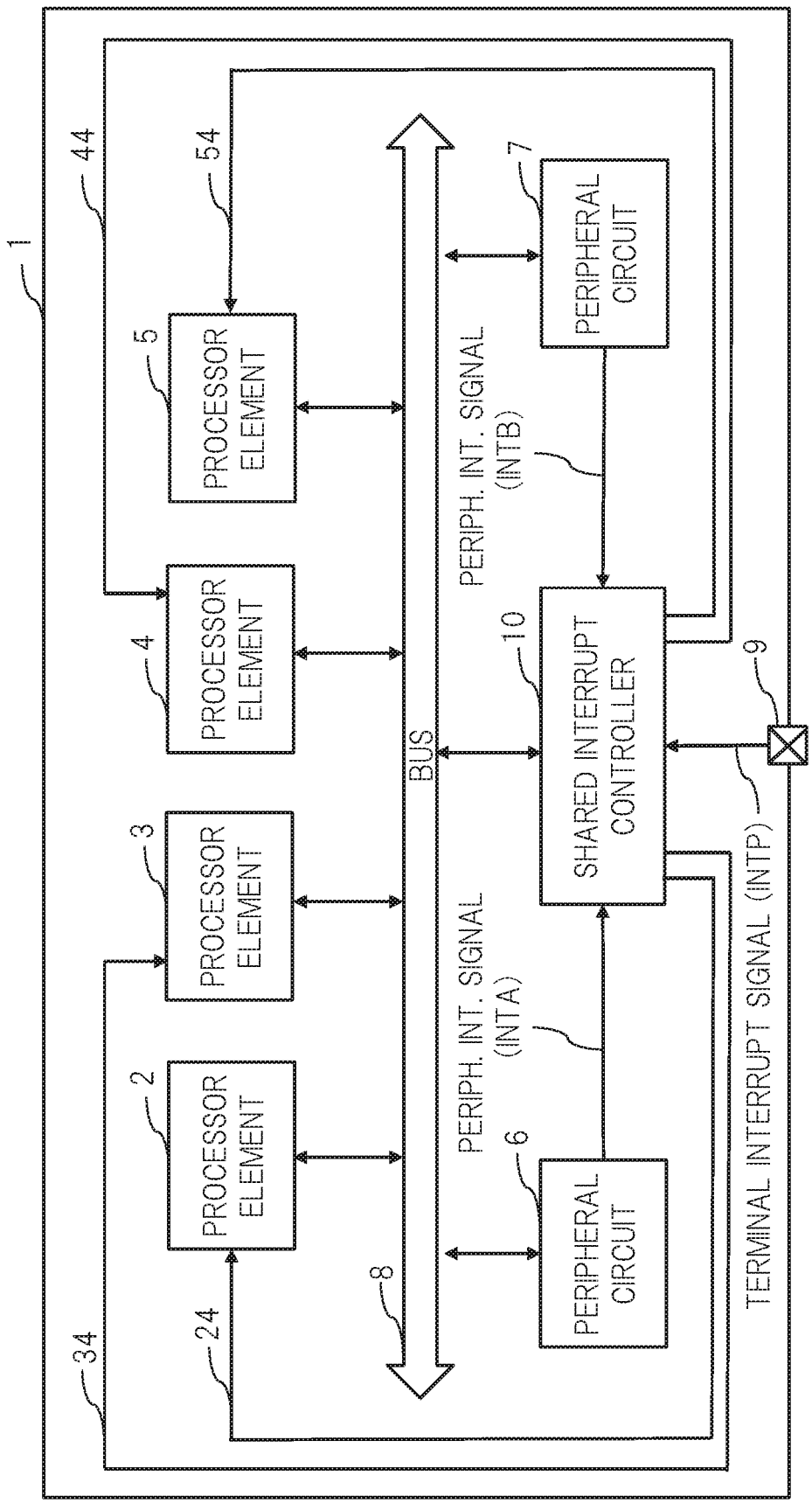
FIG. 1 is a block diagram showing a configuration example of a semiconductor device according to a first embodiment of the present invention.

FIG. 1 is a block diagram showing a configuration example of a semiconductor device 1 according to a first embodiment of the present invention. As shown in FIG. 1, the semiconductor device 1 comprises processor elements (PE) 2, 3, 4 and 5, peripheral circuits 6 and 7, a bus 8, an interrupt external terminal 9, and a shared interrupt controller 10.

Each of the processor elements 2, 3, 4 and 5 has a CPU and executes an arithmetic processing according to a program stored in a storage device (not shown) inside or outside the semiconductor device 1. In addition, the processor element executes an interrupt processing (interrupt routine) in response to an interrupt request signal as described below. FIG. 1 shows a configuration example in which the semiconductor device 1 has four processor elements. However, the semiconductor device 1 is not limited to have such a configuration. The semiconductor device 1 may have a plurality of processor elements, and may have, for example, two or eight or more processor elements.

The peripheral circuit 6 executes a predetermined processing and outputs a peripheral interrupt signal INTA to the shared interrupt controller 10. Likewise, the peripheral circuit 7 executes a predetermined processing and outputs a peripheral interrupt signal. INTB to the shared interrupt controller 10. Examples of the peripheral circuits 6 and include DMAC (Direct Memory Access Controller), a timer, a serial communication circuit, and the like. FIG. shows a configuration example in which the semiconductor device 1 has two peripheral circuits 6 and 7. However, the semiconductor device 1 is not limited to have such a configuration. The semiconductor device 1 may have one peripheral circuit, or may have a plurality of peripheral circuits. In a case where the semiconductor device 1 is a SoC (System on Chip) or a microcontroller, it is typical for the semiconductor device 1 to have a large number of peripheral circuits. In addition, FIG. 1 shows a configuration example in which the peripheral circuits 6 and 7 respectively output one peripheral interrupt signal INTA and one peripheral interrupt signal INTB to the shared interrupt controller 10. However, the semiconductor device 1 is not limited to have such a configuration. One peripheral circuit may output one peripheral interrupt signal or may output a plurality of peripheral interrupt signals. In addition, it may be configured such that, among the plurality of peripheral interrupt signals that are output by one peripheral circuit, some of the peripheral interrupt signals are directly input to one of the processor elements 2, 3, 4 and 5, while the other peripheral interrupt signals are input to the shared interrupt controller 10. Further, it may be configured such that one or more peripheral interrupt signals that are output by a certain peripheral circuit are all directly input to one of the processor elements 2, 3, 4 and 5, while one or more peripheral interrupt signals that are output by another peripheral circuit are all input to the shared interrupt controller 10.

The bus 8 connects the processor elements 2, 3, 4 and 5, the peripheral circuits 6 and 7 and the shared interrupt controller 10 to one another. Each of the processor elements 2, 3, 4 and 5 can write to a register of the peripheral circuit 6, a register of the peripheral circuit. 7 and a register of the shared interrupt controller 10 via the bus 8. In addition, each of the processor elements 2, 3, 4 and 5 can read from the register of the peripheral circuit 6, the register of the peripheral circuit 7 and the register of the shared interrupt controller 10 via the bus 8. FIG. 1 shows a configuration example in which the processor elements 2, 3, 4 and 5, the peripheral circuits 6 and 7 and the shared interrupt controller 10 are all connected to the bus 8. However, the semiconductor device 1 is not limited to have such a configuration. The semiconductor device 1 may have a plurality of buses, and the plurality of buses may be hierarchically configured.

The interrupt external terminal 9 is a terminal configured to request the interrupt to the processor elements 2, 3, 4 and 5 from, outside the semiconductor device 1. When the interrupt is requested from the interrupt external terminal 9, a terminal interrupt signal INTP is input to the shared interrupt controller 10. FIG. shows a configuration example in which the semiconductor device 1 has one interrupt external terminal. However, the semiconductor device 1 is not limited to have such configuration. The semiconductor device 1 may have a plurality of interrupt external terminals. In addition, FIG. 1 shows a configuration example in which the terminal interrupt signal INTP is input to the shared interrupt controller 10. However, the semiconductor device 1 is not limited to have such a configuration. For example, it may be configured such that the terminal interrupt signal is directly input to one of the processor elements 2, 3, 4 or 5. In addition, in a case where the semiconductor device 1 has a plurality of terminal interrupt signals, it may be configured such that some of the terminal interrupt signals are directly input to one of the processor elements 2, 3, 4 or 5, while the other terminal interrupt signals are input to the shared interrupt controller 10.

The shared interrupt controller 10 receives the peripheral interrupt signal INTA that is output by the peripheral circuit 6, the peripheral interrupt signal INTB that is output by the peripheral circuit 7, and the terminal interrupt signal INTP that is output by the interrupt external terminal 9, and outputs interrupt request signals 24, 34, 44 and 54 to the respective processor elements 2, 3, 4 and 5. FIG. 1 shows a configuration example in which the shared interrupt controller 10 receives two peripheral interrupt signals and one terminal interrupt signal. However, the semiconductor device 1 is not limited to have such a configuration. It may be configured such that the shared interrupt controller 10 receives a predetermined number of peripheral interrupt signals and a predetermined number of terminal interrupt signals.

Figure 2:
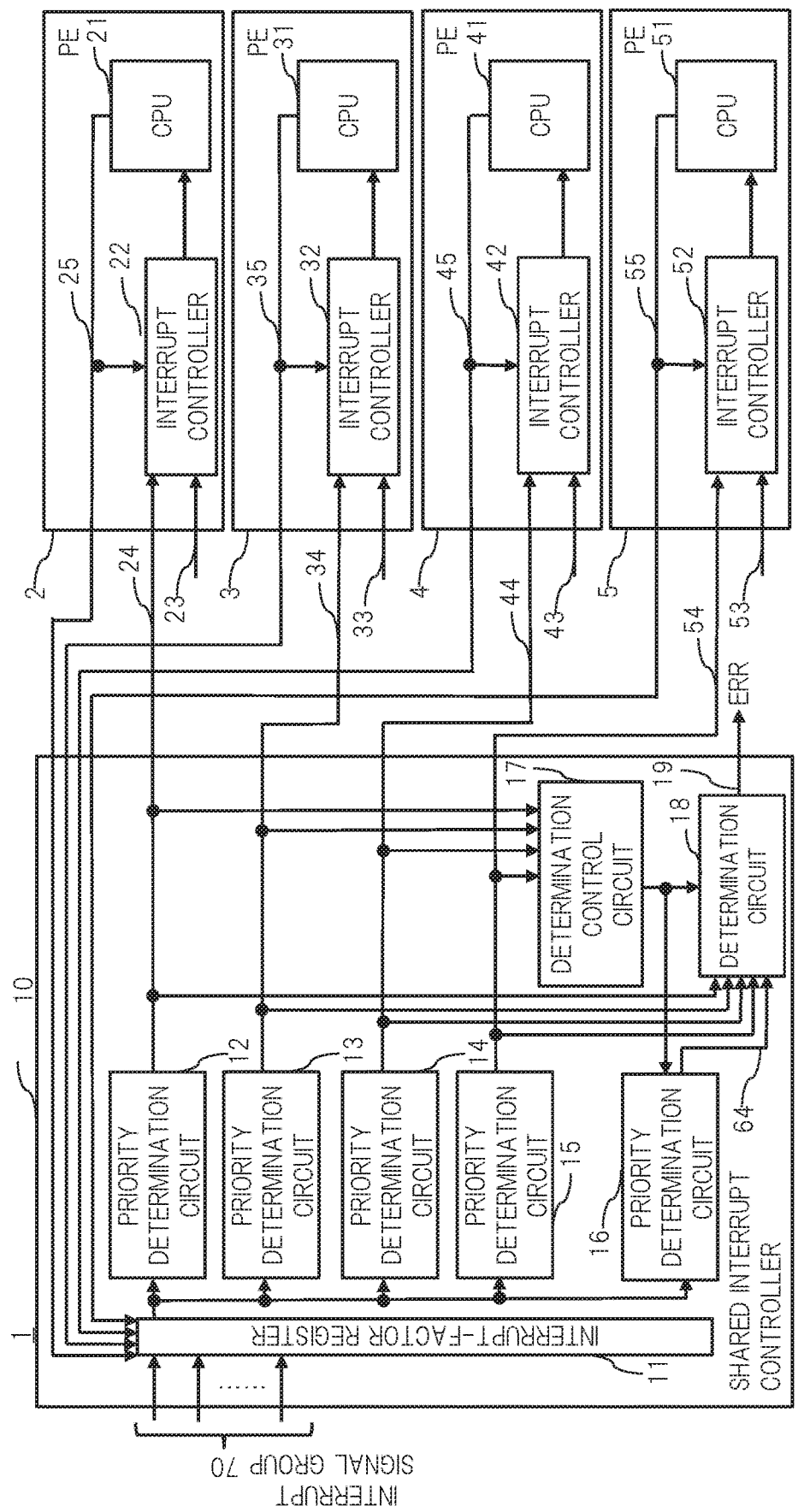
FIG. 2 is a block diagram showing a configuration example of a shared interrupt controller according to the first embodiment.

FIG. 2 is a block diagram showing a configuration example of the shared interrupt controller 10 and the processor elements 2, 3, 4 and 5 according to the first embodiment. As shown in FIG. 2, the processor element 2 comprises a CPU 21 and an interrupt controller 22. Likewise, the processor elements 3, 4 and 5 respectively comprise CPUs 31, 41 and 51 and interrupt controllers 32, 42 and 52.

The interrupt controller 22 receives an interrupt signal 23 that is processed only by the CPU 21 and the interrupt request signal 24 that is output by the shared interrupt controller 10, and outputs an interrupt request with the highest priority to the CPU 21. In response to accepting the interrupt request that is output by the interrupt controller 22, the CPU 21 notifies the interrupt controller 22 and the shared interrupt controller of an interrupt acknowledgement signal (hereinafter also referred to as "ACK signal") 25. When the interrupt acknowledgement signal 25 is activated, a bit among the bits in an interrupt-factor register 11 described below and corresponding to the acknowledged interrupt signal is cleared.

Likewise, the interrupt controller 32 receives an interrupt signal 33 that is processed only by the CPU 31 and the interrupt request signal 34 that is output by the shared interrupt controller. 10, and outputs an interrupt request with the highest priority to the CPU 31. In response to accepting the interrupt request that is output by the interrupt controller 32, the CPU 31 notifies the interrupt controller 32 and the shared interrupt controller 10 of an interrupt acknowledgement signal 35. The interrupt controller 42 receives an interrupt signal 43 that is processed only by the CPU 41 and the interrupt request signal 44 that is output by the shared interrupt controller 10, and outputs an interrupt request with the highest priority to the CPU 41. In response to accepting the interrupt request that is output by the interrupt controller 42, the CPU 41 notifies the interrupt controller 42 and the shared interrupt controller 10 of an interrupt acknowledgement signal 45. The interrupt controller 52 receives an interrupt signal 53 that is processed only by the CPU 51 and the interrupt request signal 54 that is output by the shared interrupt controller 10, and outputs an interrupt request with the highest priority to the CPU 51. In response to accepting the interrupt request that is output by the interrupt controller 52, the CPU 51 notifies the interrupt controller 52 and the shared interrupt controller 10 of an interrupt acknowledgement signal 55.

The interrupt signal 23 is processed only by the CPU 21. Likewise, the interrupt signals 33, 43 and 53 are processed only by the respective CPUs 31, 41 and 51. Thus, the interrupt signals 23, 33, 43 and 53 are directly input to each of the processor elements 2, 3, 4 and 5 without being input to the shared interrupt controller 10. The interrupt signals 23, 33, and 53 each include a predetermined number of interrupt signals. For example, each of the interrupt signals 23, 33, 43 and 53 may include zero, one, or a plurality of interrupt signals. In addition, the number of interrupt signals in the interrupt signals 23, 33, 43 and 53 need not be a number equal to one another.

The shared interrupt controller 10 comprises the interrupt-factor register 11, priority determination circuits 12, 13, 14, 15 and 16, a determination control circuit 17, and a determination circuit 18. The shared interrupt controller 10 receives the peripheral interrupt signals INTA and INTB from the peripheral circuits 6 and 7 as a part of an interrupt signal group 70. In addition, the shared interrupt controller 10 receives the terminal interrupt signal INTP from the interrupt external terminal 9 as a part of the interrupt signal group 70. Based on the received interrupt signal group 70, the shared interrupt controller 10 sets a value (e.g., 1) in the interrupt-factor register 11. The value indicates that the interrupt signal corresponding to each bit is activated.

The interrupt-factor register 11 is a register having a plurality of bits indicating whether an interrupt is requested. Each bit in the interrupt-factor register 11 holds, for example, 1 when the corresponding interrupt signal is activated, and holds 0 when the interrupt signal is not activated. The interrupt factor set in the interrupt-factor register 11 is notified to the priority determination circuits 12, 13, 14, 15 and 16. As described above, the interrupt factor set in the interrupt-factor register 11 can be configured to be cleared when the interrupt acknowledgement signal 25 is activated. In addition, the bit in the interrupt-factor register 11 corresponding to the acknowledged interrupt signal may be automatically cleared by hardware. Further, the interrupt factor set in the interrupt-factor register 11 may be configured to be cleared by software during the interrupt routine that is processed in response to the interrupt acknowledgement signal 25 being activated. In addition, it may be configured such that the peripheral circuit 6 or 7 that notified the interrupt factor during the interrupt routine is accessed and a register write is performed for deactivating the interrupt signal.

The priority determination circuit 12 is a circuit configured to determine the interrupt factor with the highest interrupt priority from among a plurality of interrupt factors requesting the interrupt to the CPU 21. A determination result obtained by the priority determination circuit 12 is sent to the processor element 2 as the interrupt request signal 24. Likewise, the priority determination circuits 13, 14 and 15 are circuits configured to determine the interrupt factor with the highest interrupt priority from among the plurality of interrupt factors requesting the interrupt to the respective CPUs 31, 41 and 51. The determination results obtained by the priority determination circuits 13, 14 and 15 are respectively sent to the processor elements 3, 4 and 5 as the interrupt request signals 34, 44 and 54, in addition, the priority determination circuit 12 also sends the interrupt request signal 24 to the determination circuit 18. Likewise, the priority determination circuits 13, 14 and 15 respectively send the interrupt request signals 34, 44 and 54 to the determination circuit 18.

The interrupt request signals 24, 34, 44 and 54 each include a REQ signal indicating that an interrupt factor is occurring. In addition, the interrupt request signals 24, 34, 44 and 54 may further include a sideband signal. The sideband signal is, for example, a signal indicating the interrupt priority of the interrupt factor that causes the REQ signal to be activated. In addition, the sideband signal may further include a signal identifying a type of interrupt factor that causes the REQ signal to be activated.

The shared interrupt controller 10 comprises a redundant priority determination circuit 16. The priority determination circuit 16 is a circuit configured to receive a same input signal as the priority determination circuit 12, 13, 14 or 15 and to perform a same processing.

The determination control circuit 17 is a circuit configured to select one priority determination circuit from among the priority determination circuits 12, 13, 14 and 15 as the circuit to be checked. The determination control circuit 17 outputs a signal (also referred to as "selected check target signal") indicating which priority determination circuit has been selected to the priority determination circuit 16 and the determination circuit 18. The priority determination circuit 16 performs a same processing as in the circuit to be checked based on the selected check target signal received from the determination control circuit 17.

The determination circuit. 18 is a circuit configured to compare processing results of the circuit to be checked and the priority determination circuit 16, and to determine whether a failure is occurring in the circuit to be checked. The determination circuit 18 receives the interrupt request signals 24, 34, 44 and 54 and the selected check target signal. Based on the selected check target signal, the determination circuit 18 compares an interrupt request signal 64 that is output by the priority determination circuit 16 and the interrupt request signal that output by the circuit to be checked. The interrupt request signal that is output by the circuit to be checked is one of the interrupt request signals 24, 34, 44 or 54. If the interrupt request signal 64 that is output by the priority determination circuit 16 and the interrupt request signal that is output by the circuit to be checked match, it is determined that the circuit to be checked is operating normally. If the interrupt request signal 64 that is output by the priority determination circuit 16 and the interrupt request signal that is output by the circuit to be checked do not match, it is determined that the circuit to be checked has a failure and is not operating normally, and outputs an error signal (ERR) 19. The semiconductor device 1 is capable of performing a desired control required for functional safety in response to detecting the error signal 19.

Figure 3:
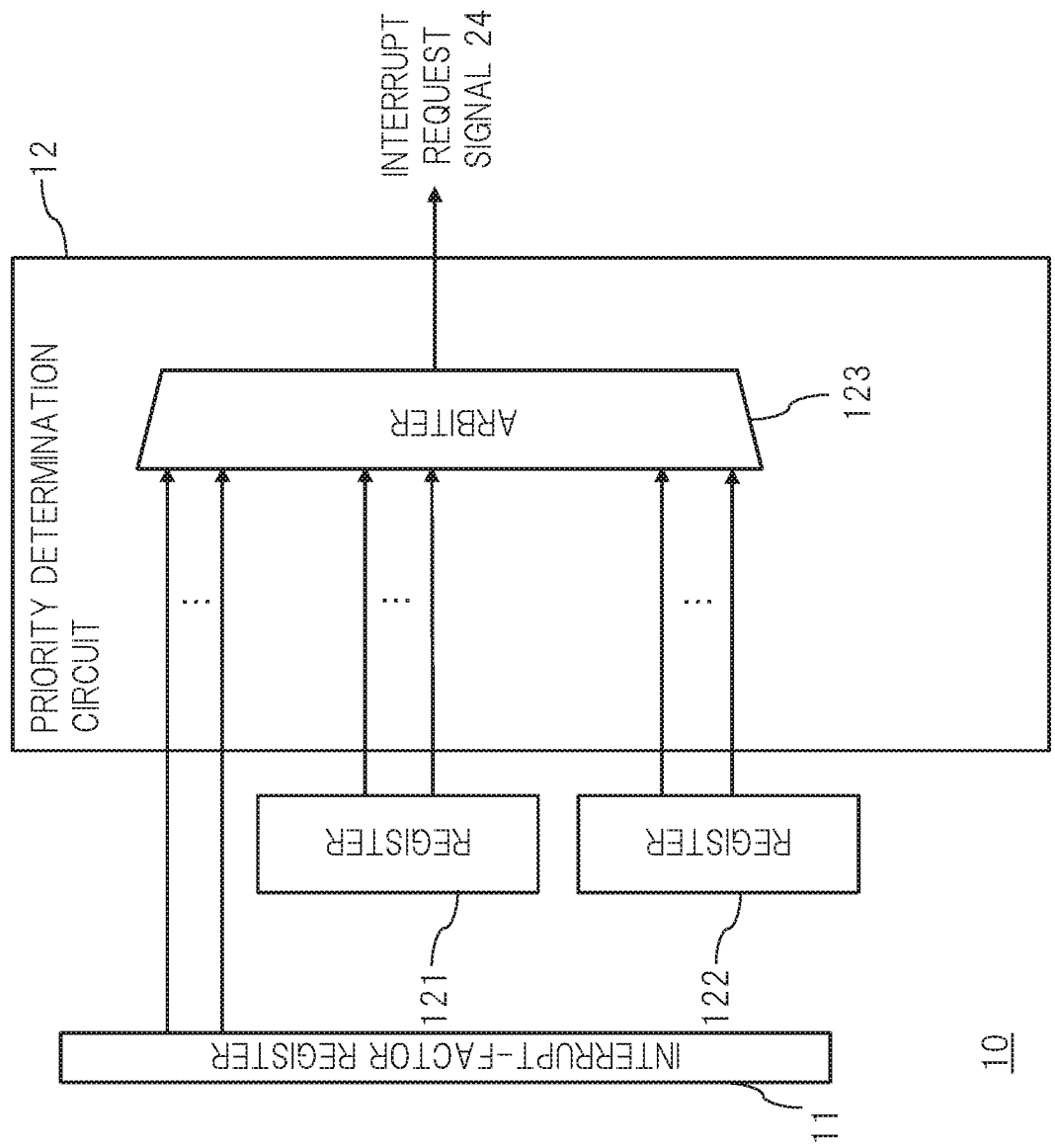
FIG. 3 is a block diagram showing a configuration example of a priority determination circuit according to the first embodiment.

FIG. 3 is a block diagram showing a configuration example of the priority determination circuit 12 according to the first embodiment. As shown in FIG. 3, the priority determination circuit 12 comprises an arbiter arbitration circuit) 123. The priority determination circuit 12 receives, from a register 121 of the shared interrupt controller 10, a signal indicating to which CPU the interrupt is requested for each interrupt factor assigned to the interrupt-factor register 11. In addition, the priority determination circuit 12 receives, from a register 122 of the shared interrupt controller 10, a signal indicating the interrupt priority of each interrupt factor assigned to the interrupt-factor register 11. Further, the priority determination circuit 12 receives, from the interrupt-factor register 11, a signal indicating whether each interrupt factor assigned to the interrupt-factor register 11 is occurring. FIG. 3 shows a configuration example of the priority determination circuit 12. However, it should be noted that the priority determination circuits 13, 14, 15 and 16 have the same configuration. Therefore, signals that are respectively output by the register 121, the register 122 and the interrupt-factor register 11 are input to the priority determination circuits 12, 13, 14, 15 and 16. Thus, the priority determination circuits 12, 13, 14, 15 and 16 operate based on a single setting with respect to each of the register 121, the register 122 and the interrupt-factor register 11. As a result, the circuit to be checked and the priority determination circuit 16 operate in the same manner as long as there are no failures therein.

The register 121 is a register configured to set which CPU to request the interrupt for each interrupt factor assigned to the interrupt-factor register 11. For example, in a case where four CPUs are provided as shown in FIG. 2, the register 121 has two bits in a field (not shown, hereinafter also referred to as "CPU designation field") for designating the CPU to which the interrupt is requested for each interrupt factor. For example, the CPU 21 is designated when the CPU designation field is 2'B00, the CPU 31 is designated when the CPU designation field is 2'B01, the CPU 41 is designated when the CPU designation field is 2'B10, and the CPU 51 is designated when the CPU designation field is 2'B11. Note that a method of designating the CPU to which the interrupt is requested is not limited to the above-described CPU designation fields.

The register 122 is a register configured to set an interrupt priority when notifying the CPU of the interrupt for each interrupt factor assigned to the interrupt-factor register 11. For example, the register 122 sets the priority for one interrupt factor using 4 bits. 0xF is assigned for an interrupt priority of 15, 0xE is assigned for an interrupt priority of 14, and 0x1 is assigned for an interrupt priority of 1. An interrupt priority of 0 is a setting having the same meaning as not notifying the CPU of the interrupt request.

Note that the method of setting the interrupt priority is not to be limited to the above-described method. For example, it may be configured such that 6 bits are provided for each interrupt factor, and that the priority is set in 64 levels in the order of highest to lowest interrupt priority such as 64, 63, 62, . . . , 2, 1. For example, in this case, 6'H00 can be defined as indicating a priority of 64, 6'H3F can be defined as indicating a priority of 63, and 6'H01 can be defined as indicating a priority of 1.

The arbiter (arbitration circuit) 123 is a winner-take-all circuit configured to determine one interrupt factor to be prioritized and notified to the CPU based on the settings in the register 121 and the register 122. For example, in a case where the interrupt priority of the peripheral interrupt signal INTA is 10, the interrupt priority of the peripheral interrupt signal INTB is 2, and the INTA and INTB are both set in the interrupt-factor register 11, the INTA having the higher interrupt priority is notified to the CPU. In a case where a plurality of interrupt signals having the highest interrupt priority are input to the arbiter (arbitration circuit) 123, the arbiter (arbitration circuit) 123 selects one interrupt factor according to a predetermined priority, and outputs it as the interrupt request signal 24. In other words, the arbiter (arbitration circuit) 123 selects one interrupt factor based on an interrupt priority that can be set by the register 122 and a priority predetermined by the hardware, and outputs it as the interrupt request signal 24.

Figure 4:
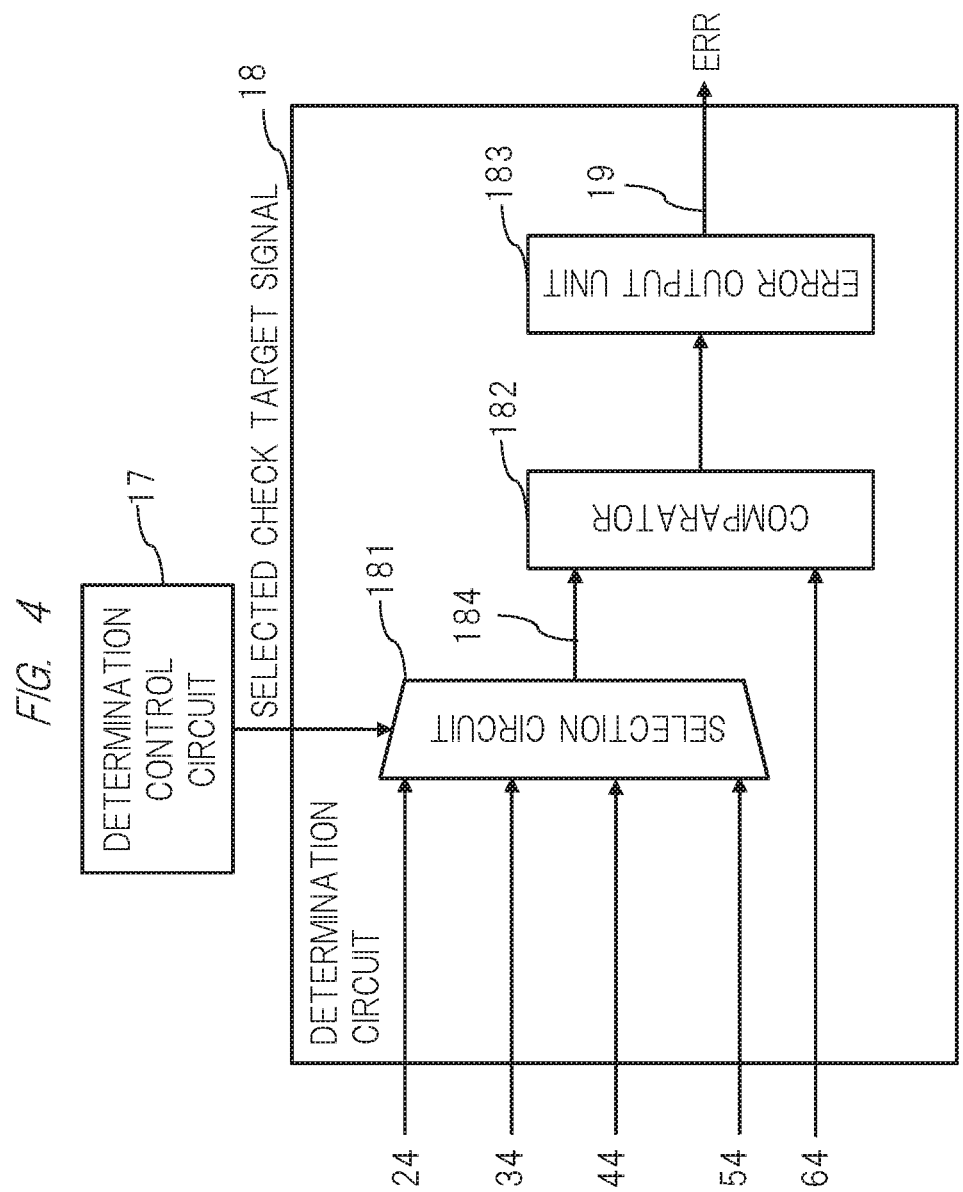
FIG. 4 is a block diagram showing a configuration example of a determination circuit according to the first embodiment.

FIG. 4 is a block diagram showing a configuration example of the determination circuit 18 according to the first embodiment. As shown in FIG. 4, the determination circuit 18 comprises a selection circuit 181, a comparator 182, and an error output unit 183.

The selection circuit 181 is a circuit configured to select one of the interrupt request signals 24, 34, 44 and 54 that are output by the priority determination circuits 12, 13, 14 and 15 based on the selected check target signal that is output by the determination control circuit 17, and to output a selected interrupt request signal 184 to the comparator 182.

Further, the comparator 182 receives the interrupt request signal. 64 that is output by the priority determination circuit 16. The comparator 182 compares the interrupt request signal 184 selected by the selection circuit 181 and the interrupt request signal 64. The comparator 182 outputs a comparison result to the error output unit 183.

The error output unit 183 outputs the error signal 19 based on the comparison result that is output by the comparator 182.

(Operation)

Figure 5:
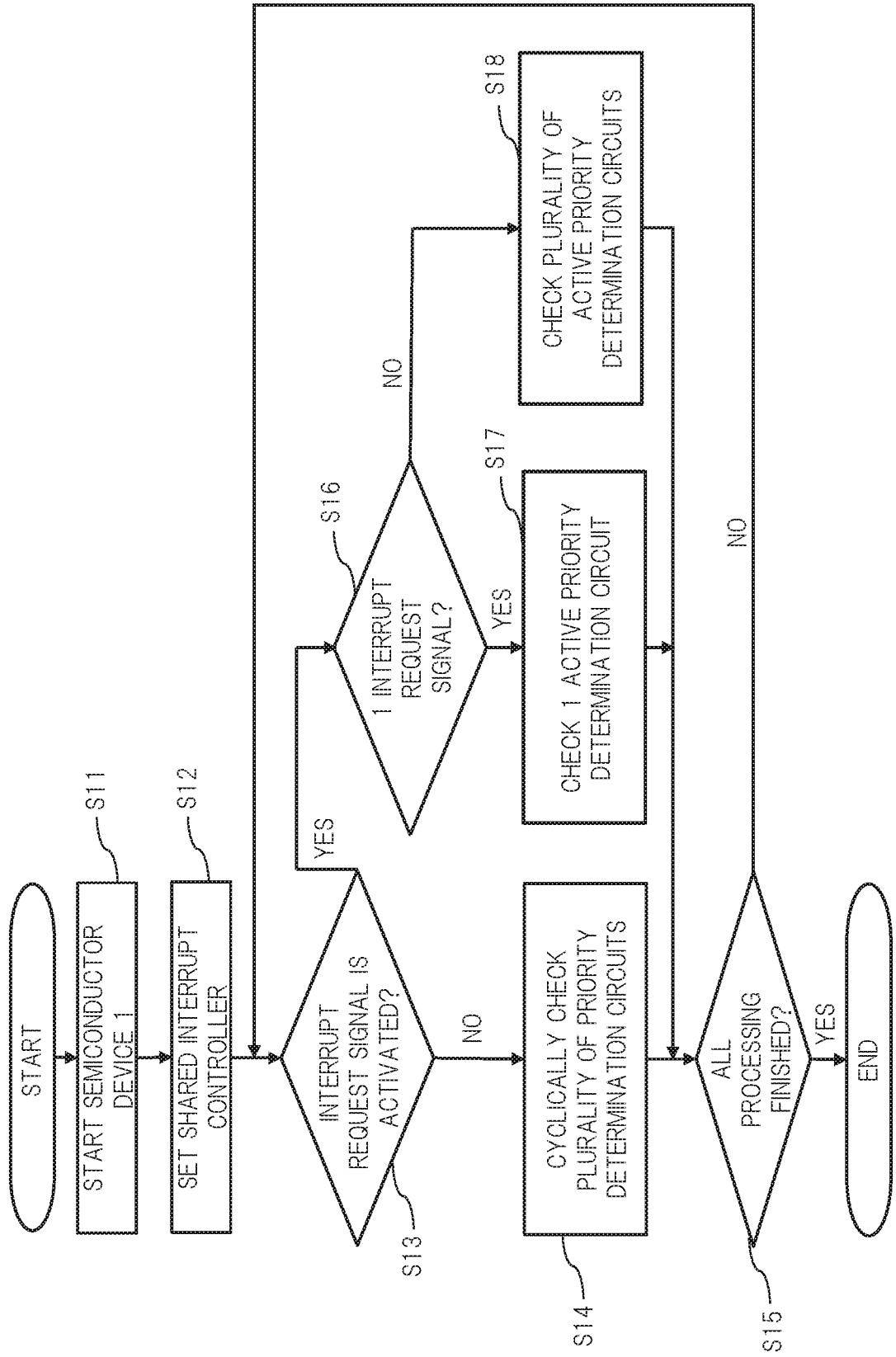
FIG. 5 is a flowchart showing an example of an operation of the semiconductor device according to the first embodiment.

FIG. 5 is a flowchart showing an operation of the semiconductor device 1. After the semiconductor device 1 is started (step S11), the CPU 21, 31, 41 or 51 sets the register 121 and the register 122 (step S12).

Then, the determination control circuit 17 determines whether the interrupt request signals 24, 34, 44 and 54 are activated based on the REQ signal in the interrupt request signal (step S13). If no interrupt request signal is activated (step S13: NO), the determination control circuit 17 performs controls so as to cyclically check the priority determination circuits 12, 13, 14 and 15 (step S14). On the other hand, if one of the interrupt request signals 24, 34, 44 and 54 is activated (step S13: YES), the determination control circuit 17 determines whether the number of activated interrupt request signals is 1 based on the REQ signal in the interrupt request signal (step S16).

If the number of activated interrupt request signals is 1 (step 6: YES), the determination control circuit 17 performs controls so as to set the priority determination circuit (also referred to as "active priority determination circuit") that is outputting the activated interrupt request signal as the circuit to be checked. In other words, the determination control circuit 17 outputs information that allows identification of the priority determination circuit (active priority determination circuit) that is outputting the activated interrupt request signal as the selected check target signal. The priority determination circuit 16 and the determination circuit 18 check an operation of the circuit to be checked based on the selected check target signal that is output by the determination control circuit 17 (step S17). On the other hand, if the number of activated interrupt request signals is more than 1 (step S16: NO), the determination control circuit 17 performs controls so as to cyclically set the plurality of priority determination circuits that are outputting the activated interrupt request signals as the circuits to be checked (step S18). In other words, if the number of activated interrupt request signals is more than 1 (step S16: NO), the determination control circuit 17 performs controls so as to cyclically set the plurality of active priority determination circuits as the circuits to be checked (step S18).

After checking of the priority determination circuit is performed in steps S14, S17 and S18, if all processing of the semiconductor device 1 is not finished (step S15: NO), processing from step S13 onwards is repeated. On the other hand, after checking of the priority determination circuit in steps S14, S17 and S18, if all processing of the semiconductor device 1 is finished (step S15: YES), the processing ends.

Figure 6:
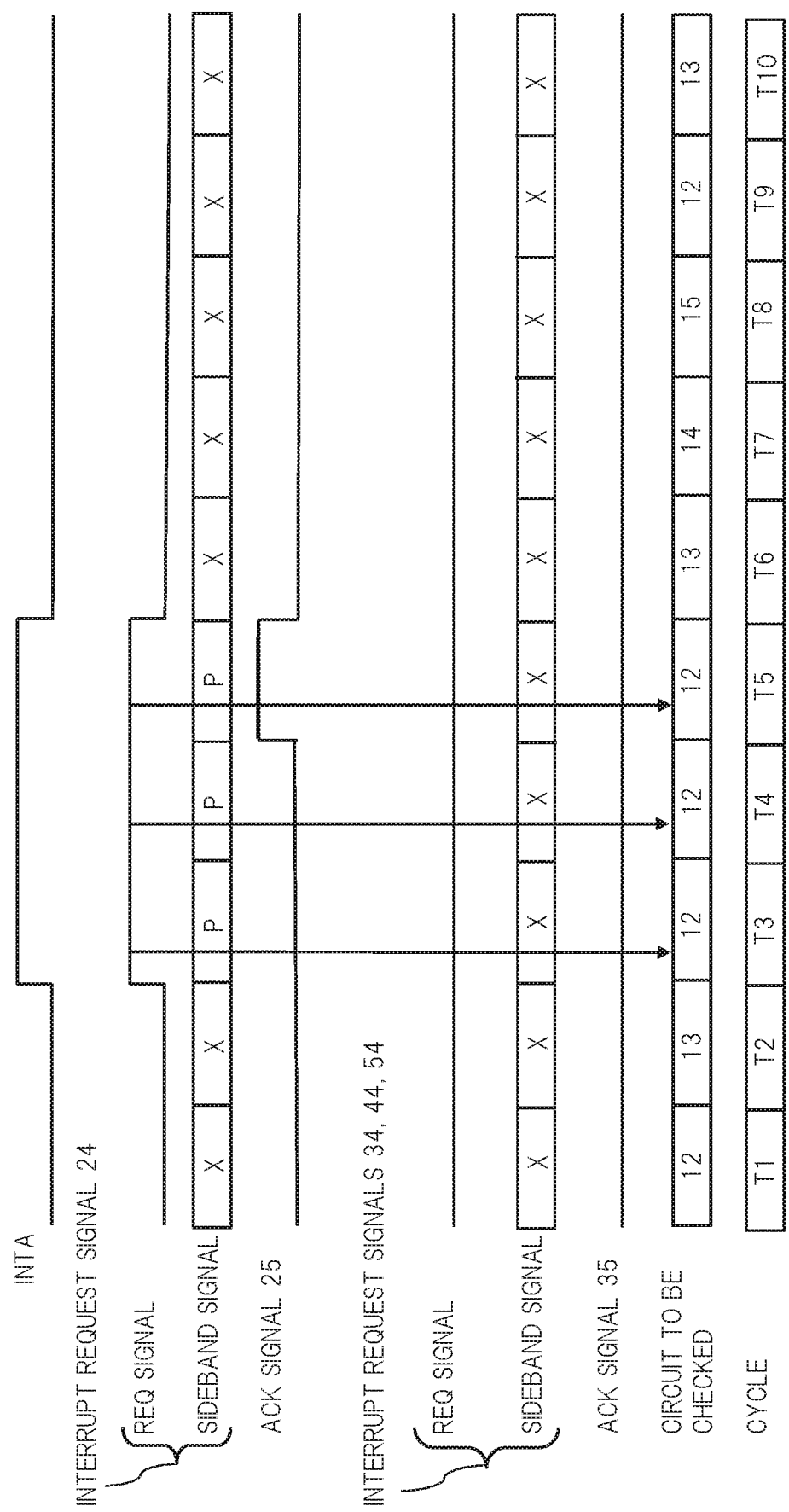
FIG. 6 is a timing chart showing an operation example of the semiconductor device according to the first embodiment.

FIG. 6 is a timing chart showing an operation example of the semiconductor device 1 in a case where only the INTA among the interrupt signal group 70 is activated. In the operation example of FIG. 6, one peripheral interrupt signal INTA among the interrupt signal group 7U received by the shared interrupt controller 10 is activated. The peripheral interrupt signal INTA is set to be notified to the CPU 21 by the register 121. On the other hand, the peripheral interrupt signal INTA is set to be not notified to the CPU 31 by the register 121. Likewise, the INTA is set to be not notified to the CPUs 41 and 51.

When the shared interrupt controller 10 receives the INTA, information indicating that the INTA has been received is set in the bit corresponding to the INTA in the interrupt-factor register 11. The priority determination circuit 12 activates the interrupt request signal 24 in cycles T3, T4 and T5 based on the information set in the interrupt-factor register 11. More specifically, the priority determination circuit 12 activates the REQ signal and simultaneously outputs a value P as the sideband signal. On the other hand, the priority determination circuits 13, 14 and 15 respectively do not activate the interrupt request signals 34, 44 and 54. More specifically, the priority determination circuits 13, 14 and 15 do not activate the REQ signals in the interrupt request signals 34, 44 and 54 in cycles T3, T4 and T5.

During the period in which the priority determination circuit 12 does not activate the interrupt request signal 24, the determination control circuit 17 selects the priority determination circuits 12, 13, 14 and 15 as the circuits to be checked while circulating through the circuits. In the operation example of FIG. 6, the interrupt request signal 24 activated during cycles T3 to T5. Thus, in cycles T1 and T2, the determination control circuit 17 sequentially selects the priority determination circuits 12 and 13 as the circuits to be checked.

If, for example, the interrupt request signal 24 is not activated in cycle T3, the determination control circuit 17 selects the priority determination circuit 14 as the circuit to be checked. However, in the operation example of FIG. 6, the interrupt request signal 24 is activated in cycle T3. Thus, the determination control circuit 17 selects the priority determination circuit 12 corresponding to the CPU 21 that is outputting the interrupt request signal 24 as the circuit to be checked. Then, during cycles T3 to T5 in which the priority determination circuit 12 activates the interrupt request signal 24, the determination control circuit 17 continues to select the priority determination circuit 12 as the circuit to be checked. The CPU 21 accepts the interrupt request signal 24, and, in cycle T5, notifies the shared interrupt controller 10 of the interrupt acknowledgement signal 25. When the interrupt acknowledgement signal 25 is activated, the bit among the bits in the interrupt-factor register 11 of the shared interrupt controller 10 and corresponding to the acknowledged interrupt signal (in this case, INTA) is cleared. Note that the bit in the interrupt-factor register 11 corresponding to the acknowledged interrupt signal may be automatically cleared by the hardware. In addition, the bit corresponding to the INTA in the interrupt-factor register 11 may be cleared by software during the interrupt routine that is processed in response to the interrupt acknowledgement signal 25 being activated. Further, it may be configured such that the peripheral circuit 6 that notified the INTA during the interrupt routine is accessed and register write is performed for deactivating the peripheral interrupt signal INTA.

In cycles T6 to T10, none of the interrupt request signals 24, 34, 44 and 54 are activated. Therefore, in cycle T6, the determination control circuit 17 selects the priority determination circuit which is the next priority determination circuit after the priority determination circuit 12 as the circuit to be checked. Thereafter, in cycles T7 to T10, the determination control circuit 17 sequentially selects the priority determination circuits 14, 15, 12 and 13 as the circuits to be checked. Namely, during the period in which the priority determination circuit 12 does not activate the interrupt request signal 24, the determination control circuit 17 selects the priority determination circuits 12, 13, 14 and 15 as the circuits to be checked while circulating through the circuits.

Figure 7:
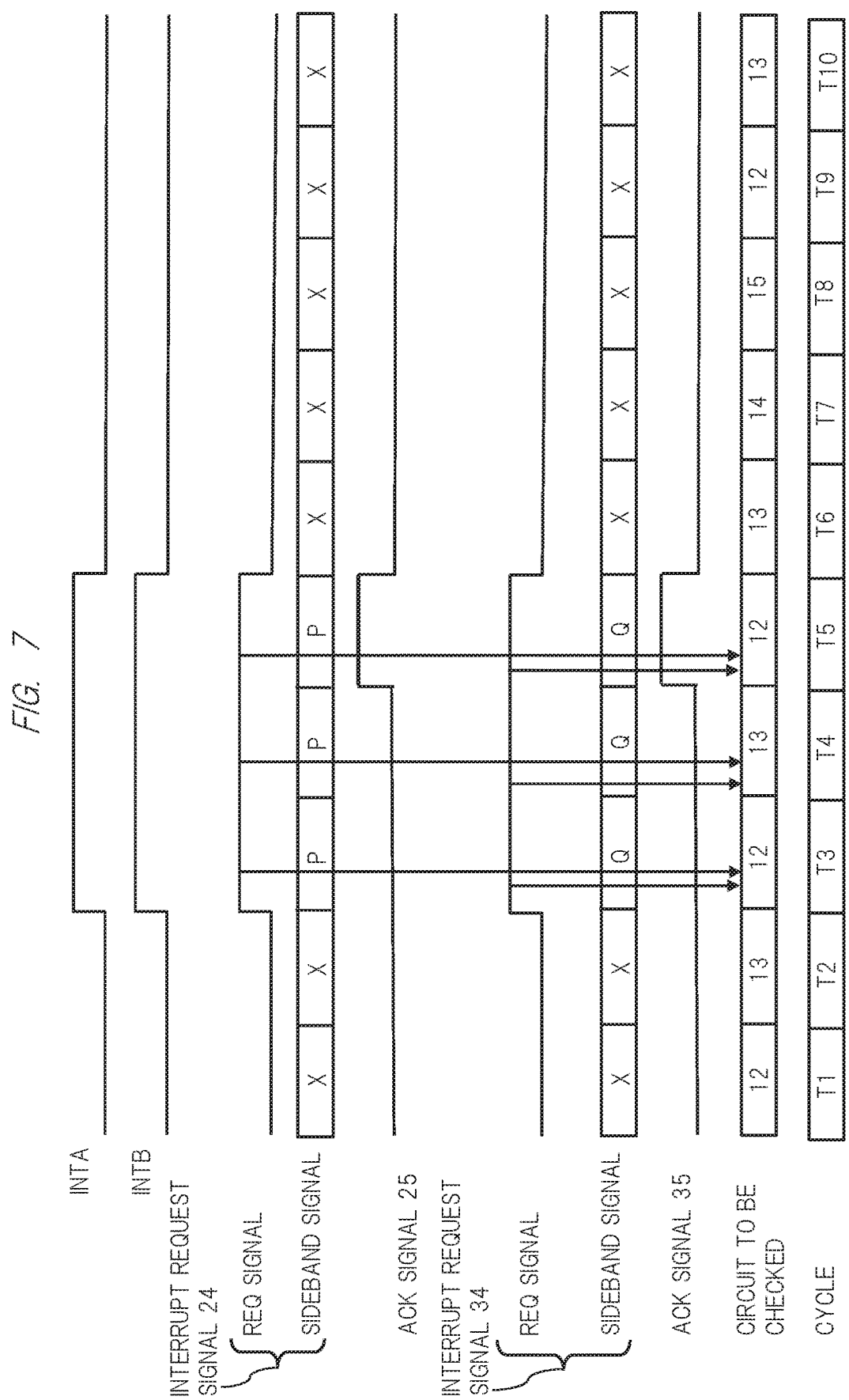
FIG. 7 is a timing chart showing another operation example of the semiconductor device according to the first embodiment.

Next, an operation of the semiconductor device 1 in a case where two peripheral interrupt signals INTA and INTB among the interrupt signal group 70 that is input to the shared interrupt controller 10 are activated will be described with reference to FIG. 7. FIG. 7 is a timing chart showing another operation example of the semiconductor device 1 where the plurality of interrupt factors are activated. In the operation example shown in FIG. 7, the peripheral interrupt signals INTA and INTB among the interrupt signal group 70 received by the shared interrupt controller 10 are activated. The INTA is set to be notified to the CPU 21 and is set to be not notified to the CPUs 31, 41 and 51. In addition, the INTB is set to be notified to the CPU 31 and is set to be not notified to the CPUs 21, 41 and 51. Whether the interrupt is to be notified or not is set by the register 121.

During the period in which the shared interrupt controller 10 is activating the plurality of interrupt request signals among the interrupt request signals 24, 34, 44 and 54, the determination control circuit 17 cyclically transitions the circuits to be checked between the priority determination circuits that are outputting the activated interrupt request signals. In the operation example shown in FIG. 7, the shared interrupt controller 10 activates the interrupt request signals 24 and 34 during cycles T3 to T5 in response to the peripheral interrupt signals INTA and INTB being activated. Thus, during cycles T3 to T5, the determination control circuit 17 circulates through the priority determination circuit 12 that outputs the interrupt request signal 24 and the priority determination circuit 13 that outputs the interrupt request signal 34, and selects the circuits as the circuits to be checked.

The interrupt request signals 24, 34, 44 and 54 can be changed until they are accepted by the CPU 21, 31, 41 or 51. For example, values of the sideband signals in the interrupt request signals 24, 34, 44 and 54 can be changed by an inactive interrupt signal among the interrupt signal group 70 being newly activated. Thus, checking the circuit to be checked only once during the period in which the REQ signals of the interrupt request signals 24, 34, 44 and 54 are activated is insufficient for monitoring the operation. Therefore, during the period in which the REQ signals are activated, the determination control circuit 17 continues to cyclically transition between the priority determination circuits that are activating the interrupt request signals.

(Effects)

In the semiconductor device 1 according to the first embodiment, the shared interrupt controller 10 has the priority determination circuit 16, the determination control circuit 17, and the determination circuit 18. The determination control circuit 17 receives the interrupt request signals 24, 34, 44 and 54 that are output by the priority determination circuits 12, 13, 14 and 15. If the interrupt request signals are activated, the determination control circuit 17 sets the priority determination circuits that output the activated interrupt request signals as the circuits to be checked. In addition, if none of the interrupt request signals 24, 34, 44 and 54 are activated, the determination control circuit 17 cyclically checks the priority determination circuits 12, 13, 14 and 15 as the circuits to be checked. Therefore, the semiconductor device 1 according to the first embodiment is capable of detecting a failure of the priority determination circuit in the interrupt controller depending on the need of monitoring the operation more quickly than the second comparative example. An addition, the semiconductor device 1 is capable of detecting failures of the priority determination circuits 12, 13, 14 and 15 by one checker circuit 16, even if there are four priority determination circuits depending on the number of CPUs. Therefore, the semiconductor device 1 is capable of detecting a failure of the priority determination circuit while suppressing an increase in the amount of hardware as compared to the first comparative example. In addition, according to the first embodiment, as the number of CPUs increases, the greater the effect of suppressing the amount of hardware.

Next, failure modes of the priority determination circuit that can be detected in the first embodiment will be described. Three failure modes of the priority determination circuit can be assumed as the failure modes. A first failure mode is a failure mode in which the activated interrupt request continues to be output to the CPU by a specific interrupt factor. The first failure mode can be caused by a failure in which the REQ signal that is output by the priority determination circuit is fixed to a value (such as indicating that the signal is activated, or a failure in which the sideband signal is fixed to a certain value. A second failure mode is a failure mode in which the interrupt request signal is not output contrary to expectations for a particular interrupt factor. The second failure mode can be caused by a failure in which the REQ signal that is output by the priority determination circuit is fixed to a value (such as 0) indicating that the signal is not activated. In addition, if the sideband signal indicates a type of interrupt factor, the second failure mode can be caused by a failure in which the sideband signal is fixed. A third failure mode is a failure mode in which the interrupt request based on the plurality of interrupt factors is output in an interchanging manner contrary to expectations. The third failure mode is a failure mode in which, as a result of a failure in the priority determination circuit, the signal in the sideband signal indicating the priority or the signal indicating the type of interrupt factor is changed during assertion of the REQ signal. If the CPU acknowledges the interrupt and sends the interrupt acknowledgement signal, causing the corresponding bit in the interrupt-factor register 11 to be cleared, the effect of the failure is lost. As a result, the period during which the third failure mode is apparent is shortened, making it difficult to detect the third failure mode. In addition, in order to detect the third failure mode, it would be necessary to check detection statuses of all interrupt factors, and the third failure mode is susceptible to time variation, whereby it would be difficult to detect the third failure mode.

The shared interrupt controller 10 according to the present embodiment cyclically checks the priority determination circuits 12, 13, 14 and 15 when the interrupt request signals 24, 34, 44 and 54 are not activated, whereby it is possible to detect the second failure mode. In addition, if the interrupt request signal 24, 34, 44 or 54 is activated, the priority determination circuit activating the interrupt request signal is selected as the circuit to be checked, whereby it is possible to detect the first failure mode and the third failure mode. Further, the semiconductor device according to the first embodiment prioritizes and selects the priority determination circuit activating the interrupt request signal as the circuit to be checked, whereby it is possible to quickly stop processing of the CPU that acknowledged an incorrect interrupt request signal. In addition, the priority determination circuit activating the interrupt request signal is prioritized and selected as the circuit to be checked, whereby the semiconductor device 1 according to the first embodiment can improve a probability of detecting the third failure mode having a short appearance period. Namely, when simply circulating through and checking all of the priority determination circuits, the probability of detecting the third failure mode decreases as the number of CPUs increases. However, the determination control circuit 17 according to the first embodiment prioritizes and selects the priority determination circuit activating the interrupt request signal as the circuit to be checked. Thus, the semiconductor device 1 according to the first embodiment can improve the probability of detecting the third failure mode.

Second Embodiment

Figure 8:
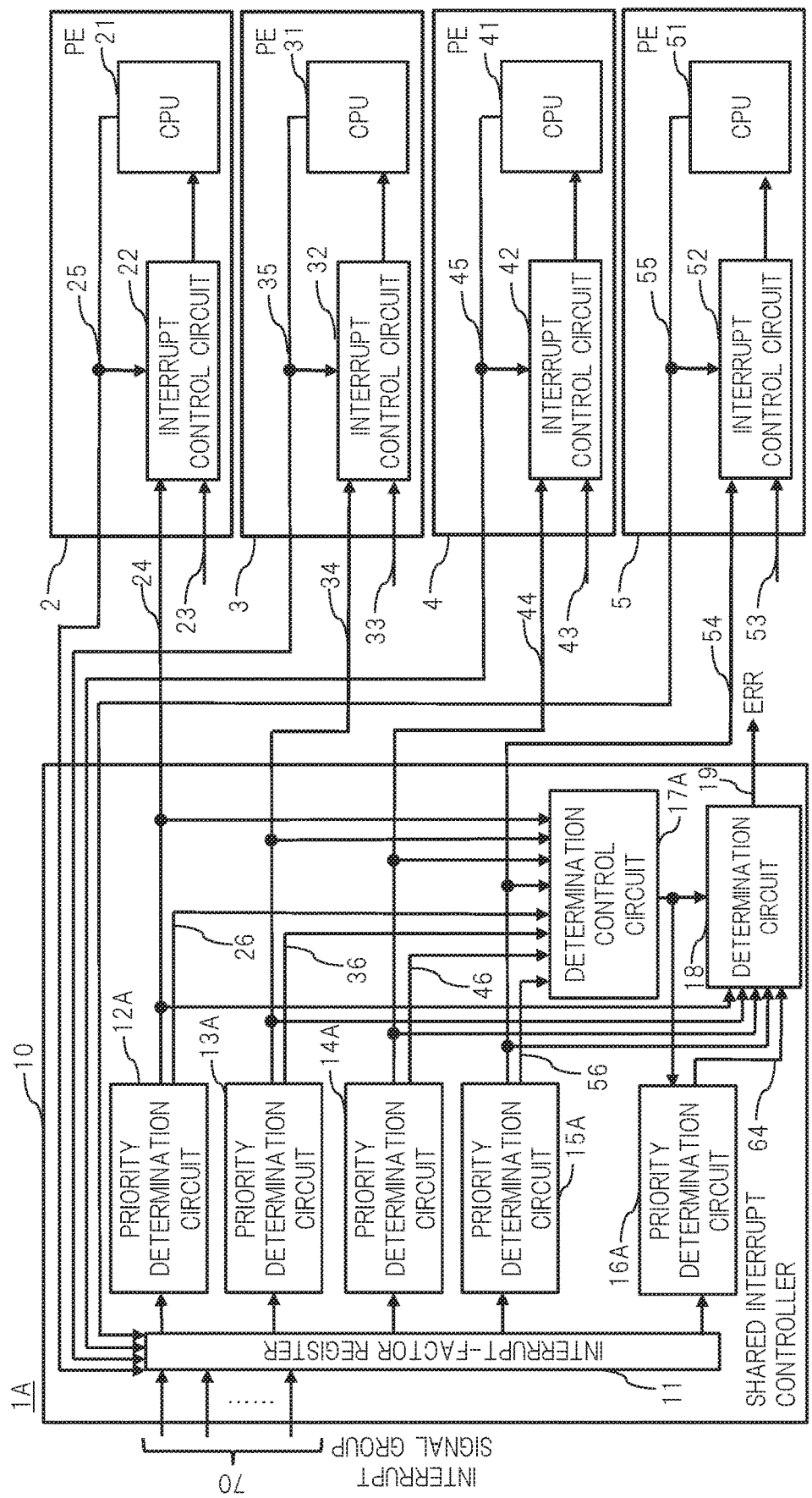
FIG. 8 is a block diagram showing a configuration example of a shared interrupt controller according to a second embodiment of the present invention.

Next, a second embodiment will be described. FIG. 8 is a block diagram showing a configuration example of a semiconductor device 1A according to the second embodiment. The semiconductor device 1A according to the second embodiment differs from the semiconductor device 1 according to the first embodiment in that multiple interrupt detection signals 26, 36, 46 and 56 are output from priority determination circuits 12A, 13A, 14A and 15A to a determination control circuit 17A. In addition, the semiconductor device 1A according to the second embodiment differs from the semiconductor device 1 according to the first embodiment in that the determination control circuit 17A selects the circuit to be checked with reference to the multiple interrupt detection signals 26, 36, 46 and 56 in addition to the interrupt request signals 24, 34, 44 and 54. Other configurations and operations are the same as those of the semiconductor device 1 described in the first embodiment, whereby the same members are denoted by the same reference signs, and redundant descriptions thereof are omitted as appropriate.

The priority determination circuits 12A, 13A, 14A and 15A according to the second embodiment respectively output the multiple interrupt detection signals 26, 36, 46 and 56 indicating whether the plurality of interrupt factors are received for the corresponding CPU.

Figure 9:
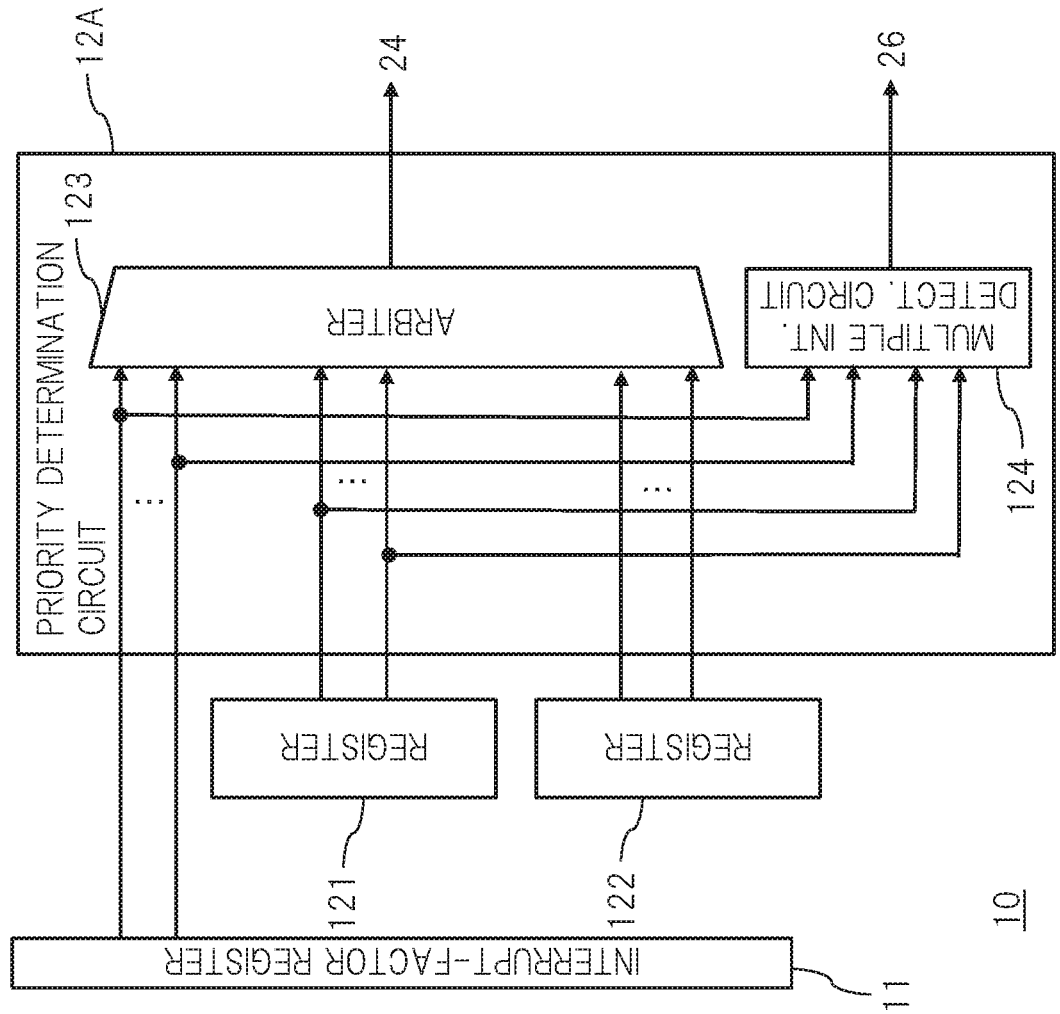
FIG. 9 is a block diagram showing a configuration example of a priority determination circuit according to the second embodiment.

FIG. 9 is a block diagram showing a configuration example of the priority determination circuit. 12A according to the second embodiment. The priority determination circuit 12A comprises a multiple interrupt detection circuit 124. The multiple interrupt detection circuit 124 outputs the multiple interrupt detection signal 26 indicating whether the plurality of interrupt factors are occurring based on the register 121 that sets which CPU is to be requested the interrupt for each interrupt factor, and on reception statuses of the peripheral interrupt signal indicated by the interrupt-factor register 11 and the terminal interrupt signal. Hereinafter, the multiple interrupt detection circuit 124 will be described using a case where the priority determination circuit 12A is receiving the INTA and the INTB as an example. When the INTA is set to be notified to the CPU 21 and the INTB is set to be notified to the CPU 31 according to the settings in the register 121, the multiple interrupt detection circuit 124 outputs a signal (such as 0) as the multiple interrupt detection signal 26 indicating that one interrupt factor has been detected. On the other hand, when the INTA is set to be notified to the CPU 21 and the INTB is also set to be notified to the CPU 21 according to the settings in the register 121, the multiple interrupt detection circuit 124 outputs a signal (such as 1) as the multiple interrupt detection signal 26 indicating that the plurality of interrupt factors have been detected.

The determination control circuit 17A receives the multiple interrupt detection signals 26, 36, 46 and 56 in addition to the interrupt request signals 24, 34, 44 and 54. If there are a plurality of priority determination circuits activating the interrupt request signals, the determination control circuit 17A prioritizes the priority determination circuit activating the multiple interrupt detection signal over the priority determination circuit not activating the multiple interrupt detection signal, and performs a control to set it as the circuit to be checked.

(Operation)

Figure 10:
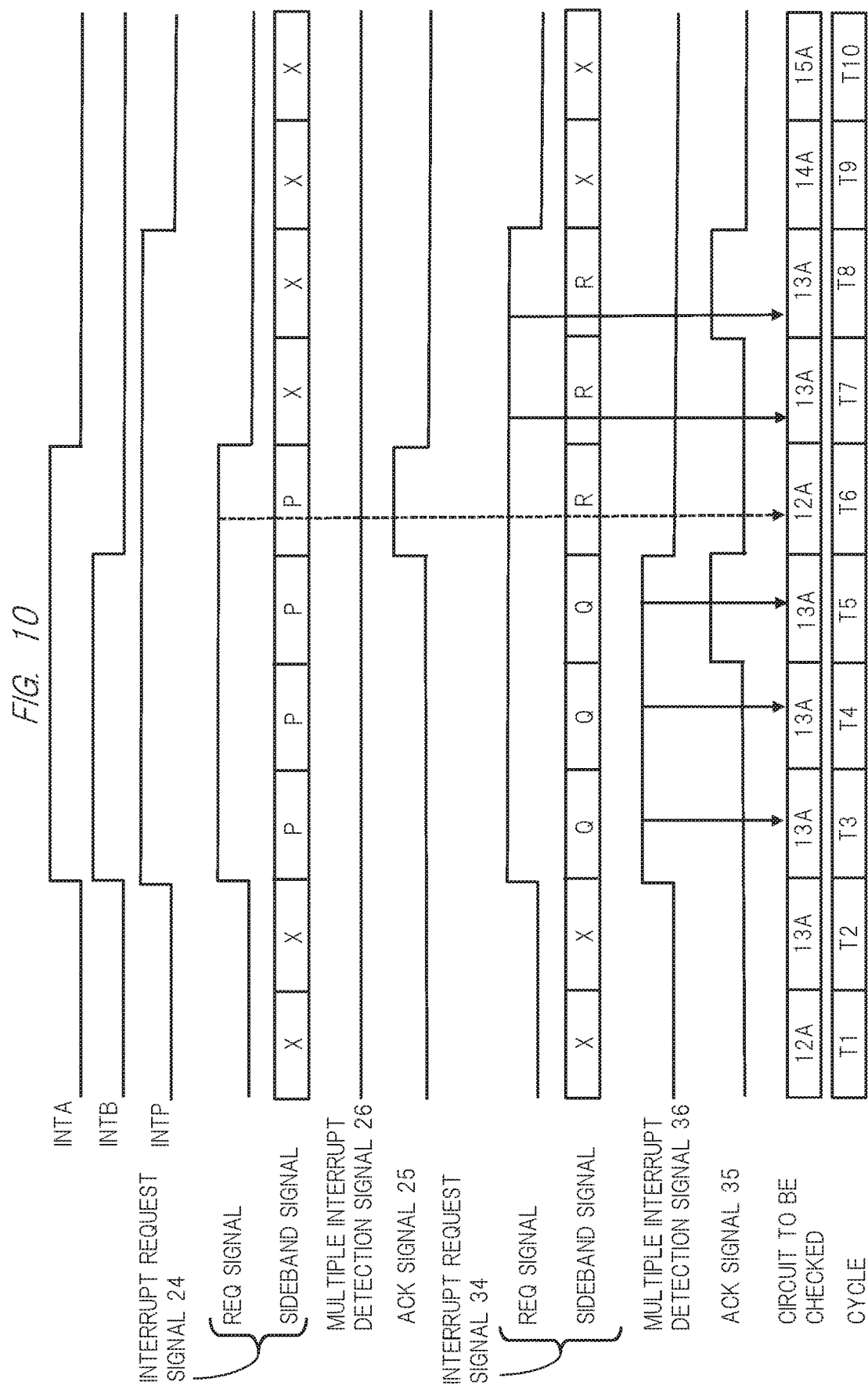
FIG. 10 is a timing chart showing an operation example of a semiconductor device according to the second embodiment.

FIG. 10 is a timing chart showing an operation example of the semiconductor device 1A according to the second embodiment. In the operation example of FIG. 10, the INTA is set to be notified to the CPU 21 and is set to be not notified to the CPUs 31, 41 and 51 by the register 121. The INTB is set to be notified to the CPU 31 and is set to be not notified to the CPUs 21, 41 and 51. The INTP is set to be notified to the CPU 31 and is set to be not notified to the CPUs 21, 41 and 51. The priority determination circuits 14A and 15A respectively do not activate the interrupt request signals 44 and 54 during cycles T1 to T10. Thus, in FIG. 10, signals relating to the priority determination circuits 14A and 15A are omitted as appropriate.

During the period in which the priority determination circuits 12A, 13A, 14A and 15A respectively do not activate the interrupt request signals 24, 34, 44 and 54, the determination control circuit 17A selects the priority determination circuits 12A, 13A, 14A and 15A as the circuits to be checked while circulating through the circuits. In the operation example of FIG. 10, the interrupt request signal 24 is activated during cycles T3 to T6. In addition, the interrupt request signal 34 is activated during cycles T3 to T8. Thus, in cycles T1 and T2, the determination control circuit 17A sequentially selects the priority determination circuits 12A and 13A as the circuits to be checked.

If, for example, the interrupt request signals 24 and 34 are not activated in cycle T3, the determination control circuit. 17A selects the priority determination circuit 14A as the circuit to be checked. However, as shown in FIG. 10, the interrupt request signals 24 and 34 are activated in cycle T3. Thus, the determination control circuit 17A does not select the priority determination circuit 14A as the circuit to be checked. The multiple interrupt detection signal 26 that is output by the priority determination circuit 12A is not activated and the multiple interrupt detection signal 36 that is output by the priority determination circuit 13A is activated, whereby the priority determination circuit 13A is prioritized and selected as the circuit to be checked. During cycles T3 to T5 in which the multiple interrupt detection signal 36 is activated, the determination control circuit 17A selects the priority determination circuit 13A as the circuit to be checked.

When the INTB is acknowledged by the CPU 31 and the interrupt factor of the INTB held in the interrupt-factor register 11 is cleared, the priority determination circuit 13A receives only the INTP. Thus, in cycle T6 which is the cycle after receiving the interrupt acknowledgement signal 35, the multiple interrupt detection signal 36 is deactivated. In cycle T6, none of the multiple interrupt detection signals 26, 36, 46 and 56 are activated. In addition, in cycle T6, the interrupt request signals 24 and 34 are both activated. Therefore, in cycle T6, the determination control circuit 17A performs control so as to cyclically check the priority determination circuits 12A and 13A. The determination control circuit 17A selected the priority determination circuit 13A as the circuit to be checked in cycle T5, whereby the priority determination circuit 12A is selected as the circuit to be checked in cycle T6.

In cycles T7 and T8 none of the multiple interrupt detection signals 26, 36, 46 and 56 are activated. In addition, in cycles T7 and T8, only the interrupt request signal 34 is activated and the interrupt request signals 24, 44 and 54 are not activated. Therefore, in cycles T7 and T8, the determination control circuit 17A selects the priority determination circuit 13A as the circuit to be checked.

In cycles T9 and T10, none of the interrupt request signals 24, 34, 44 and 54 are activated. Therefore, in cycles T9 and T10, the determination control circuit 17A circulates through the priority determination circuits 12A, 13A, 14A and 15A and selects the circuits as the circuits to be checked. The determination control circuit 17A selected the priority determination circuit 13A as the circuit to be checked in cycle T8, whereby the priority determination circuit 14A is selected as the circuit to be checked in cycle T0. In cycle T10, the determination control circuit 17A selects the priority determination circuit 15A as the circuit to be checked.

Note that, when two or more of the multiple interrupt detection signals 26, 36, 46 and 56 are activated, the determination control circuit 17A circulates through the plurality of priority determination circuits activating the signals and sequentially selects the circuits as the circuits to be checked.

(Effects)

The third failure mode can occur only when the plurality of interrupt factors are activated. Therefore, excluding the priority determination circuits not activating the multiple interrupt detection signal from the circuit to be checked and prioritizing the priority determination circuit activating the multiple interrupt detection signal increases the probability of detecting the third failure mode with a short appearance period. According to the present embodiment, the determination control circuit 17A of the semiconductor device 1A further receives the multiple interrupt detection signals 26, 36, 46 and 56 in addition to the interrupt request signals 24, 34, 44 and 54. Thus, the semiconductor device 1A according to the second embodiment can further improve the probability of detecting the third failure mode having a short appearance period.

In the foregoing, the invention according to the present invention has been concretely described based on the embodiments. However, the present invention is not limited to the foregoing embodiments, and various modifications and alterations can be made within the scope of the present invention.

What is claimed is:

1. A semiconductor device comprising:
a first processor element configured to receive a first interrupt request signal;
a second processor element configured to receive a second interrupt request signal;
a first priority determination circuit configured to receive a plurality of interrupt signals and to output the first interrupt request signal to the first processor element;
a second priority determination circuit configured to receive the plurality of interrupt signals and to output the second interrupt request signal to the second processor element;
a checker circuit configured to detect failures of the first priority determination circuit and the second priority determination circuit; and
a control circuit configured to select one of the first priority determination circuit or the second priority determination circuit as a circuit to be checked,
wherein the control circuit receives the first interrupt request signal and the second interrupt request signal, and selects the circuit to be checked based on the first interrupt request signal and the second interrupt request signal, and
wherein each of the first interrupt request signal and the second interrupt request signal includes a signal indicating that an interrupt factor is occurring.

2. The semiconductor device according to claim 1, wherein each of the first interrupt request signal and the second interrupt request signal further includes a signal indicating a priority of the interrupt factor.

3. The semiconductor device according to claim 1, wherein each of the first interrupt request signal and the second interrupt request signal further includes a signal identifying a type of the interrupt factor.

4. The semiconductor device according to claim 1, wherein, if the first interrupt request signal and the second interrupt request signal are not activated, the control circuit sequentially selects the first priority determination circuit and the second priority determination circuit as the circuits to be checked.

5. The semiconductor device according to claim 1, wherein, if the first interrupt request signal is activated, the control circuit selects the first priority determination circuit as the circuit to be checked.

6. The semiconductor device according to claim 1,
wherein, if the first interrupt request signal and the second interrupt request signal are activated, the control circuit sequentially selects the first priority determination circuit and the second priority determination circuit as the circuits to be checked.

7. The semiconductor device according to claim 1,
wherein the first priority determination circuit comprises a first detection circuit configured to determine whether two or more interrupt signals are received,
the first detection circuit outputs a first detection signal indicating whether a plurality of interrupt signals are received to the control circuit,
the second priority determination circuit comprises a second detection circuit configured to determine whether two or more interrupt signals are received,
the second detection circuit outputs a second detection signal indicating whether a plurality of interrupt signals are received to the control circuit, and
if the first detection signal is activated, the control circuit sets the first priority determination circuit as the circuit to be checked.

8. The semiconductor device according to claim 7,
wherein, if the first detection signal and the second detection signal are both activated, the control circuit sequentially selects the first priority determination circuit and the second priority determination circuit as the circuits to be checked.

9. A semiconductor device comprising:
an N number (where N is a natural number and satisfies N≥2) of processor elements;
an N number of priority determination circuits configured to receive a plurality of interrupt signals and to output an N number of sets of interrupt request signals to the N number of processor elements;

a checker circuit configured to perform a same processing as in one of the N number of priority determination circuits and to output an interrupt request signal;

a control circuit configured to receive the N number of sets of interrupt request signals that are output by the N number of priority determination circuits and to select one of the N number of priority determination circuits as a circuit to be checked based on the N number of sets of interrupt request signals; and a determination circuit configured to compare the interrupt request signal that is output by the circuit to be checked and the interrupt request signal that is output by the checker circuit, and to output an error signal based on a comparison result, wherein each of the interrupt request signal that is output by the circuit to be checked and the interrupt request signal that is output by the checker circuit includes a signal indicating that an interrupt factor is occurring.

10. The semiconductor device according to claim 9, wherein, if none of the N number of sets of interrupt request signals are activated, the control circuit sequentially selects the N number of priority determination circuits as the circuits to be checked, if one set among the N number of sets of interrupt request signals is activated, the control circuit selects the priority determination circuit that outputs the activated interrupt request signal as the circuit to be checked, and if an M number (where M is a natural number and satisfies N≥M≥2) of sets of interrupt request signals among the N number of sets of interrupt request signals are activated, the control circuit sequentially selects an M number of priority determination circuits that output the activated M number of sets of interrupt request signals.

11. The semiconductor device according to claim 9, wherein the N number of priority determination circuits further include an N number of detection circuits configured to detect whether two or more interrupt signals are received, the priority determination circuits being configured such that each include the detection circuit, the N number of detection circuits output a detection signal to the control circuit, the detection signal indicating whether the corresponding priority determination circuit has received two or more interrupt signals, if one set among the N number of sets of detection signals is activated, the control circuit selects the priority determination circuit that outputs the activated detection signal as the circuit to be checked, and if an L number (where L is a natural number and satisfies N≥L≥2 and M≥L) of sets of detection signals among the N number of sets of detection signals are activated, the control circuit selects an L number of priority determination circuits that output the activated L number of sets of detection signals as the circuits to be checked.

12. An operation method of a semiconductor device comprising a plurality of processor elements, a plurality of priority determination circuits and a checker circuit, the operation method including:

a step of outputting an interrupt request signal to the processor element corresponding to each of the plurality of priority determination circuits;

a step of selecting one of the plurality of priority determination circuits as a circuit to be checked;

a step of making the checker circuit execute a same processing as in the circuit to be checked based on a selection result obtained in the step of selecting;

a step of comparing the interrupt request signal that is output by the circuit to be checked and an interrupt request signal that is output by the checker circuit, wherein each of the interrupt request signal that is output by the circuit to be checked and the interrupt request signal that is output by the checker circuit includes a signal indicating that an interrupt factor is occurring; and a step of outputting an error signal based on a comparison result obtained in the step of comparing, wherein the step of selecting further includes a step of selecting the priority determination circuit that outputs an activated interrupt request signal as the circuit to be checked.

13. The operation method of a semiconductor device according to claim 12, wherein the step of selecting further includes a step of sequentially selecting the plurality of priority determination circuits as the circuits to be checked if no activated interrupt request signal is output.

14. The operation method of a semiconductor device according to claim 13, wherein the step of selecting further includes a step of sequentially selecting the priority determination circuits that output the activated interrupt request signals as the circuits to be checked if there are two or more activated interrupt request signals.

15. The operation method of a semiconductor device according to claim 12, wherein each of the plurality of priority determination circuits further comprises a detection circuit, the operation method further includes a step of detecting whether the priority determination circuit is receiving a plurality of interrupt signals by the detection circuit, and the step of selecting further includes a step of selecting the circuit to be checked based on a detection result obtained in the step of detecting.

16. The operation method of a semiconductor device according to claim 15, wherein the step of selecting further includes a step of sequentially selecting the two or more priority determination circuits as the circuits to be checked if the detection result obtained in the step of detecting indicates that two or more priority determination circuits have received the plurality of interrupt signals.

* * * * *